Oct. 27, 1953     P. A. O'NEILL     2,656,611
LIQUID LEVEL GAUGE
Filed March 2, 1951     2 Sheets-Sheet 1
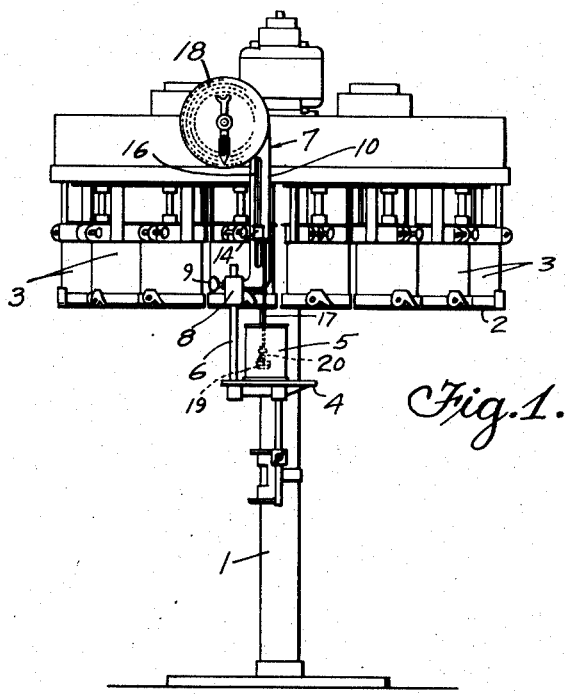
Fig. 1.
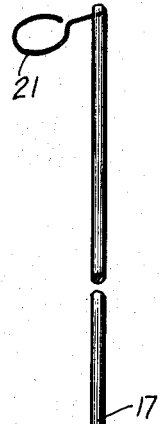
Fig. 3.
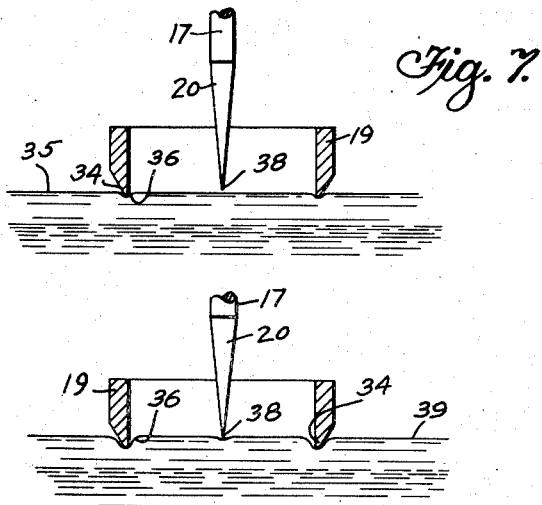
Fig. 7.
Fig. 8.
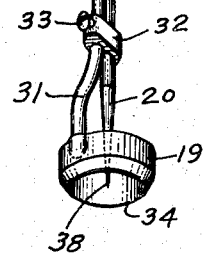
INVENTOR.
Paul A. O'neill.
BY John Flanw
ATTORNEY.

Oct. 27, 1953 P. A. O'NEILL 2,656,611
LIQUID LEVEL GAUGE
Filed March 2, 1951 2 Sheets-Sheet 2

INVENTOR.
Paul A. O'Neill.
BY
John Flam
ATTORNEY.

Patented Oct. 27, 1953

2,656,611

UNITED STATES PATENT OFFICE 2,656,611

LIQUID LEVEL GAUGE

Paul A. O'Neill, San Francisco, Calif., assignor to Union Machine Company, San Francisco, Calif., a corporation of California Application March 2, 1951, Serial No. 213,625

6 Claims. (Cl. 33—126.7)

This invention relates to a gauge for visually determining when the level of liquid attains a predetermined height.

In Patent No. 2,537,277, granted January 9, 1951 to the assignee of this application, a float structure for this purpose is described. This float structure is shown for the purpose of gauging the amount of different ingredients to be used in a paint or lacquer mixture. That float structure includes a float proper made of light wood, such as balsa, from which a very light stem rises. The stem is freely vertically movable, so that the top of the stem may move a delicately pivoted pointer when the liquid level has moved the float upwardly to a predetermined point. Movement of the pointer to an index then is indicative that the desired liquid level has been attained.

It is one of the objects of this invention to provide a liquid level gauge that performs the same function as the float structure, but without any moving parts. In this way, errors due to the effect of gravity or friction are entirely avoided.

It is another object of this invention to provide a liquid level gauge that is simple and inexpensive and thoroughly reliable in operation.

This invention possesses many other advantages and has other objects which may be made more clearly apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is an elevation of a paint dispensing apparatus, such as disclosed in the patent hereinabove referred to, and utilizing the invention;

Fig. 3 is a perspective view of the liquid gauge proper;

Figure 2:
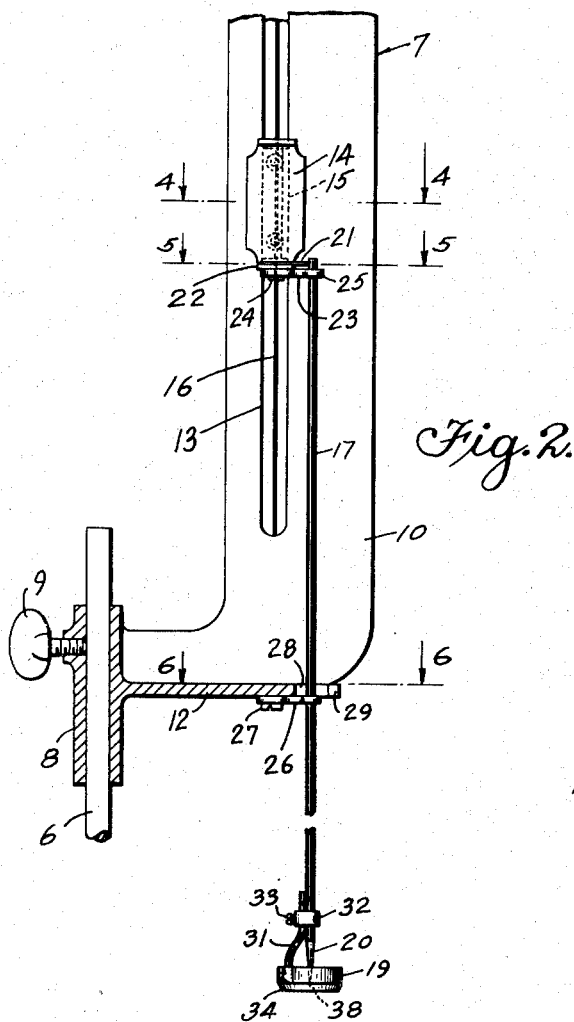
Fig. 2 is an enlarged fragmentary view, partly in section, of the gauging apparatus and its supports.
Figure 5:
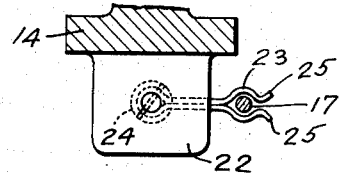
Figure 6:
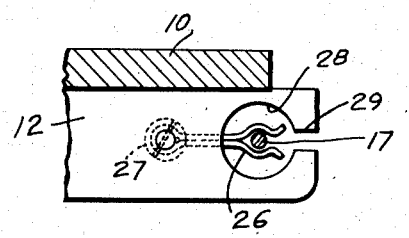
Figure 4:
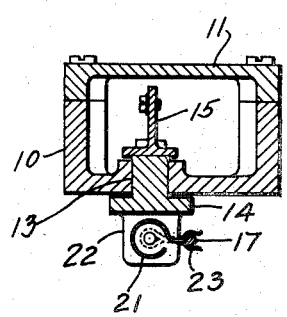

Figs. 4, 5, and 6 are sectional views, taken along a plane corresponding to lines 4—4, 5—5, and 6—6 of Fig. 2; and Figs. 7 and 8 are enlarged fragmentary sectional views illustrating the manner in which the gauging operation is performed.

The liquid gauging member is shown as utilized in connection with paint distributing apparatus. This apparatus includes a pedestal 1 and a manually rotatable support 2 upon which are supported a plurality of cans 3, all as disclosed in the said prior patent.

The pedestal 1 serves to support a platform 4 upon which a can 5 rests for receiving paint, or other ingredients, from any one of the cans 3.

Rising from the platform 4 is a supporting post 6 upon which the gauging apparatus 7 is adjustably supported. For this purpose, this gauging apparatus 7 is provided at its lower end with a sleeve 8 (see Fig. 2) and a clamping screw 9 which may be tightened against the post 6.

The gauging apparatus includes a box-like structure, such as a frame 10 and a rear cover member 11 (Figs. 2, 4, 5, and 6). The sleeve 8 is shown as integrally formed with this frame-like structure, as by the aid of the horizontal rib 12.

The front wall of the frame 10 is provided with a longitudinal slot 13 (Figs. 2 and 4) for the accommodation of a slide 14. This slide carries at its rear end a clamp device 15 for the flexible element 16 that extends to the dial mechanism 18 (Fig. 1). This structure is subsantially the same as that disclosed in the patent hereinabove referred to.

The position of the slide 14 along the slot 13 is determined by appropriate manipulation of the dial mechanism 18, and corresponds to the desired level to be attained in the container 5.

The gauging elements are supported by the slide 14. These elements include a vertical stem 17 carrying the gauging members 19 and 20 at its lower end. The stem 17 is provided at its upper end with a wire loop 21 (Fig. 3) that may rest upon a shelf 22 extending from the slide 14. The stem 17 is guided during the process of adjustment of the slide 14, by the spring guide or clip member 23 attached, as by a screw 24, to the lower surface of the shelf 22. The clip 23 is provided with opposed arcuate portions and divergent ends 25 to permit ready removal and replacement of the stem 17.

Near its lower end, the stem 17 is guided by a similar guide member 26, attached to the lower surface of the rib 12 as by the aid of the screw 27. This rib member 12, as shown most clearly in Fig. 6, is provided with an aperture 28 and a slot 29 to permit the passage of the stem 17 when it is replaced or removed.

The annular gauge member 19 (Figs. 2, 3, 7, and 8) is supported at the lower end of the stem 17. This is accomplished by the aid of a rod 31 attached to the exterior of the annular member 19, as by welding, or the like. This rod 31 is bent inwardly, as shown most clearly in Figs. 2 and 3, so as to lie adjacent the stem 17. A metal loop 32 encompasses both the stem 17 and the front end of the rod 31. A screw 33 extends through the loop to tighten the rod 31 against the stem 17.

By this clamping means, it is possible to adjust the position of the annular member 19 with respect to the stem 17.

The annular member 19 terminates at its lower end in a tapered edge 34. The tapered edge 34, all parts of which lie in a common plane, is formed by inner and outer surfaces of the member 19 that converge toward each other. These surfaces meet to form the edge 34 that may be considered as the locus of a series of points, all of the points lying in the plane of the edge. This tapered edge 34 thus falls on a common horizontal plane when the gauging device is installed in the paint distributing apparatus. When the liquid level 35 reaches this tapered edge, surface tension of the liquid produces a definite depressed band 36 around the edge 34. This depressed band is visible to the eye, and the operator then knows that the liquid level 35 has reached almost to the desired height.

The lower end 39 of the stem 17 is tapered to form a point 38. This point 38 is vertically disposed from the plane of the edge 34. For example, it may be displaced slightly above it, as indicated most clearly in Fig. 7. When the liquid level 39, as shown in Fig. 8, reaches the point 38, a decided dimple or depression is formed by virtue of the surface tension of the liquid. This depression is readily visibly detectable by the operator; and he then knows that the liquid level 39 has reached the height which has been predetermined by the setting of the gauge 17.

Since even a slight dimple or depression produced by the tapered point 38 is readily visible, an accurate gauging of the liquid level is readily effected. Since the depression formed by the tapered edge 34 occurs just before the level rises to the desired height, the operator is warned thereby to watch for the formation of the center dimple at the point 38.

The inventor claims:

1. A liquid level gauge comprising: an annular member having inner and outer surfaces converging toward each other forming an annular edge lying in a plane; means defining a point; and means securing said point forming means to said member and disposing said point within said annular member, said point terminating on one side of said plane.

2. A liquid level gauge comprising: an annular member having an annular edge formed by inner and outer surfaces of the member converging toward each other, said edge lying in a plane; means defining a point; and means securing said point forming means to said member and disposing said point within said member, said point extending toward, but terminating short of said plane.

3. A liquid level gauge comprising: an annular member having an annular edge formed by inner and outer surfaces of the member converging toward each other, said edge lying in a plane; means defining a point disposed within said annular member, said point terminating on one side of said plane; and a support for the annular member upon said means.

4. A liquid level gauge comprising: an annular member having an annular edge formed by inner and outer surfaces of the member converging toward each other, said edge lying in a plane; means forming a tapered point; and means securing said point forming means to said member so that the axis of said point is substantialy normal to the plane, said point terminating on one side of said plane.

5. A liquid level gauge comprising: a hollow open-ended member having inner and outer surfaces which converge toward each other in a direction toward one end of the member, said converging surfaces define points lying in a common plane, all of the surfaces of the member being on one side of the plane; means forming another point within said hollow member and on said one side of said plane and spaced from said member; and means securing said other point forming means and said member together so that said other point is spaced from said plane.

6. A liquid level gauge comprising: a hollow open-ended member having inner and outer surfaces converging toward each other forming a continuous edge lying in a plane; means defining a point; and means securing said point defining means to said member and disposing said point within said hollow member, said point terminating on one side of said plane.

PAUL A. O'NEILL.

References Cited in the file of this patent

UNITED STATES PATENTS

| Number | Name | Date |
|---|---|---|
| 1,187,607 | Carney et al. | June 20, 1916 |
| 1,526,179 | Parr et al. | Feb. 10, 1925 |
| 1,726,296 | Hamblen | Aug. 27, 1929 |
| 1,836,612 | Miller | Dec. 15, 1931 |
| 2,051,307 | Lorraine | Aug. 18, 1936 |
| 2,123,479 | Spencer | July 12, 1938 |
| 2,127,042 | Morrell | Aug. 16, 1938 |
| 2,368,705 | du Pont et al. | Feb. 6, 1945 |